United States Patent [19]
Brown

[11] Patent Number: 5,252,118
[45] Date of Patent: Oct. 12, 1993

[54] BIOLOGICAL-CHEMICAL FILM-COATING CRYOPROTECTANT FOR PLANTS

[76] Inventor: Paul W. Brown, P.O. Box 176, Charlton City, Mass. 01508

[21] Appl. No.: 893,574

[22] Filed: Jun. 4, 1992

[51] Int. Cl.⁵ ............................................. C05G 3/00
[52] U.S. Cl. ............................................. 71/23; 71/1; 71/64.09; 71/64.1; 47/2
[58] Field of Search ............ 71/1.11, 23, 64.07, 71/64.09, 64.1, 904, 900; 47/2

[56] References Cited

U.S. PATENT DOCUMENTS

| | | | |
|---|---|---|---|
| 4,015,366 | 4/1977 | Hall, III | 47/2 |
| 4,086,331 | 4/1978 | Neumann | 71/64.09 |
| 4,735,737 | 4/1988 | Woods | 47/2 |

*Primary Examiner*—Ferris Lander
*Attorney, Agent, or Firm*—Michael I. Kroll

[57] ABSTRACT

The present invention relates to a method for producing a cryoprotectant for plants. The method for producing a cryoprotectant for plants includes the steps of, mixing citrus pectin in boiling distilled water, cooling the solution of the mixing step, diluting phosphoric acid ($H_3PO_4$) in distilled water, mixing the solution of the cooling step with the solution of the diluting step, reacting the solution of the mixing step, combining calcium phosphate ($CaH(PO_4)$) with the solution of the reacting step, and adding calcium hydroxide to the solution of the combining step mixing and adding a nutrient solution to complete the formulation of the cryoprotectant.

8 Claims, No Drawings

BIOLOGICAL-CHEMICAL FILM-COATING CRYOPROTECTANT FOR PLANTS

BACKGROUND OF THE INVENTION

1. Field of the Invention

The present invention relates to a cryoprotectant.

More particularly, the present invention relates to a cryoprotectant for plants.

2. Description of the Prior Art

Numerous innovations for cryoprotectants have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a cryoprotectant that avoids the disadvantages of the prior art.

More particularly, it is an object of the present invention to provide a cryoprotectant for plants.

The cryoprotectant of the present invention was developed specifically to be used on citrus and other similar type plants and to protect them against frost and freeze damage.

The cryoprotectant of the present invention is a complex chemical formulation.

When this complex chemical formulation is sprayed on plants, it coats the plant parts and then forms a coating film which is not easily washed off plants for the first few days.

The cryoprotectant of the present invention gives frost and freeze protection, both as a wet coating and as a film coating after drying.

A frost protection down to 26° F. has been confirmed on miniature orange plants (calamondin orange).

The film coating of the cryoprotectant of the present invention peels off the plants by itself in the days following the spraying.

While protecting sprayed plants against frost and freeze, the cryoprotectant of the present invention also acts as a topical fertilizer All of the chemicals used in the cryoprotectant of the present invention are U.S.D.A. approved for use in agriculture.

The cryoprotectant of the present invention is based on a chemically treated, naturally occurring non-toxic polymer that is a plant derivative, that is therefore envirormentally safe.

In keeping with these objects, and with others which will become apparent hereinafter, one feature of the present invention resides, briefly stated, in a method for producing a cryoprotectant for plants, including the steps of, mixing citrus pectin in boiling distilled water, cooling the solution of the mixing step, diluting phosphoric acid ($H_3PO_4$) in distilled water, mixing the solution of the cooling step with the solution of the diluting step, reacting the solution of the mixing step, combining calcium phosphate $CaH(PO_4)$ with the solution of the reacting step, and adding calcium hydroxide to the solution of the combining step.

In accordance with another feature of the present invention, the mixing step includes 20 grams of citrus pectin and 1,000 ml. of boiling distilled water.

Another feature of the present invention is that the cooling step includes cooling to 70° F.

Yet another feature of the present invention is that the diluting step includes one gram of phosphoric acid ($H_3PO_4$) and 100 ml. of distilled water.

Still another feature of the present invention is that the mixing step is allowed to react for 1 hour.

Yet still another feature of the present invention is that the combining step includes 10 grams of calcium phosphate $CaH(PO_4)$.

Still yet another feature of the present invention is that the adding step includes enough calcium hydroxide ($Ca(OH)_2$) so that the pH level becomes 5.0.

Another feature of the present invention is that the adding step is a nutrient solution.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

DETAILED DESCRIPTION OF THE PREFERRED EMBODIMENT

The basic material used in producing the cryoprotectant for plants of the present invention s pectin of citrus origin. Citrus pectin is chosen because it is the most available form of pectin, plus the cryoprotectant of the present invention is primarily designed to be used on citrus plants.

Pectin is a generic term for a group of polysaccharides, mainly partially methoxylated polygalacturonic acids, which are located in the cell walls of all plant tissues.

The main sources of pectin are citrus peel and apple pomace. Pectins are readily soluble in water, to give viscous stable solutions.

Pectins are made up of long chains of linked galacturonic acid residues. The galacturonic acid residues all possess the six membered pyranose ring structure. In pectic acid the carboxyl groups are free and therefore able to combine with available cations. Pectin solutions form a viscous solution which is negatively charged (acid to litmus) and pectin solutions are stable under mildly acidic conditions. Strongly acidic or basic conditions cause depolymerization of pectins.

The acid induced depolymerization of pectin, is the basis of the cryoprotectant of the present invention.

The production procedure for the cryoprotectant of the present invention is as follows:

Step 1:

Mix 20 grams of citrus pectin in 1,000 ml. of boiling distilled water;

Step 2:

The resulting solution is then cooled to room temperature, approximately 70° F;

Step 3:

Dilute one gram of phosphoric acid ($H_3PO_4$) in 100 ml. of distilled water;

Step 4:

The solution of Step 2 is treated with the solution of Step 3;

Step 5:

The Solution of Step 4 is mixed and allowed to react for one hour. This lowers the pH of the pectin solution to about 3.0 (strongly acid) and depolymerization of the pectin takes place. The result is depolymerized pectin-phosphoric acid solution;

Step 6:

10 grams of calcium phosphate (dibasic) CaH(PO$_4$) is mixed into the resulting solution of Step 5. The pH remains about 3.0. The CaH(PO$_4$) dissolves better in the acid solution of Step 5 than in just water and is therefore added in this step.

Step 7:

Calcium hydroxide (Ca(OH)$_2$) or hydrated lime is now added to the depolymerized pectin phosphoric acid and calcium phosphate solution from Step 6 until the pH is raised to 5.0. The reason for Step 7 is to raise the pH so that the solution of step 6 is not too acidic for use on plants.

Depending if calcium hydroxide (Ca(OH)$_2$) or hydrated lime is used, compounds of calcium, magnesium, and phosphate are formed. Certain (ions) will bond to various areas of the six membered pyranose ring structures. Exactly what compounds are formed and where the various (ions) will bond to the pyranose ring structures, is not known at this time. The fact that different batches of pectin have different compositions also complicates the determination of the compounds present in the final solution. The only facts known about the solution of Step 7, that is, the cryoprotectant of the present invention, is the ingredients, method of production, and how well it works against frost and freeze.

Step 8:

The ingredients of the cryoprotectant of the present invention include a nutrient solution:

12 grams of potassium nitrate—KNO$_3$;
10 grams of sodium nitrate—NaNO$_3$;
11 grams of sodium sulfate—NaSO$_4$;
10 grams of potassium phosphate—KH$_2$PO$_4$;
100 mgrams of ferrous sulfate—FeSO$_4$;
2 grams of magnesium sulfate—MgSO$_4$;
1 mgram of manganese sulfate—MnSO$_4$;
1 mgram of zinc sulfate—ZnSO$_4$;
1 mgram of copper sulfate—CuSO$_4$; and
0.5 mgram of borax The exact solution may have to be changed slightly according to local soil contents. The nutrient solution is mixed separately in 200 ml. of distilled water.

Step 9:

The nutrient solution from Step 8 is then added to the solution of Step 7, supra, and mixed.

The cryoprotectant solution of the present invention contains both macronutrients and micronutrients, needed by plants for proper growth. It also contains a special potassium sodium mixture which helps control plant cell osmotic pressure.

The cryoprotectant of the present invention is sprayed on citrus and other similar plants, before frost, to protect the plants from frost and freeze damage. The solution gels and eventually forms a dry plastic like film coat on the plant parts.

The functions of the cryoprotectant of the present invention include:

The viscous pectin phosphoric acid solution gels and then turns into a plastic like film coating on sprayed plant parts, protecting them against frost by providing a barrier;

The pectin phosphoric acid solution contains cations and anions, some of which are absorbed topically by plant cells. Ion absorption increase the plant cell salt content. Plant cells which contain high salt contents freeze at lower temperatures than cells with low salt contents.

Since the ions are absorbed by the plant cells, the cryoprotectant of the present invention acts as a topical fertilizer.

The increase in plant cell salt content changes the water crystal structure. It is the water crystal structure, expanding during freezing and thawing that ruptures the plant cell wall, causing freeze damage.

Since the cryoprotectant of the present invention contains chemically bonded elements and free ions, both cations and anions, it is an active electrolyte solution. These chemical ions actively slow the freezing reaction of water.

The potassium sodium mixture of the cryoprotectant of the present invention acts to lower the plant cell osmotic pressure. This reduces the water pressure on the cell wall during freezing and thawing and reduces the chance of cell wall rupture damage.

It will be understood that each of the elements described above, or two or more together, may also find a useful application in other types of constructions differing from the type described above.

While the invention has been illustrated and described as embodied in a cryoprotectant for plants, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for producing a cryoprotectant for plants, comprising the steps of:
    a) mixing citrus pectin in boiling distilled water;
    b) cooling the solution of said mixing step;
    c) diluting phosphoric acid (H$_3$PO$_4$) in distilled water;
    d) mixing the solution of said cooling step with the solution of said diluting step;
    e) reacting the solution of said mixing step;
    f) combining calcium phosphate (CaH(PO$_4$) with the solution of said reacting step; and
    g) adding calcium hydroxide to the solution of said combining step.

2. A method as defined in claim 1, wherein said mixing step includes 20 grams of citrus pectin and 1,000 ml. of boiling distilled water.

3. A method as defined in claim 2, wherein said cooling step includes cooling to 70°.

4. A method as defined in claim 3, wherein said diluting step includes one gram of phosphoric acid (H$_3$PO$_4$) and 100 ml. of distilled water.

5. A method as defined in claim 4, wherein said mixing step is allowed to react for 1 hour.

6. A method as defined in claim 5, wherein said combining step includes 10 grams of calcium phosphate CaH(PO$_4$).

7. A method as defined in claim 6, wherein said adding step includes enough calcium hydroxide (Ca(OH)$_2$) so the pH level becomes 5.0.

8. A method as defined in claim 7, wherein said adding step includes nutrient solution.

* * * * *